(12) United States Patent
Zabawskyj et al.

(10) Patent No.: US 8,767,689 B2
(45) Date of Patent: Jul. 1, 2014

(54) METHOD AND SYSTEM FOR CALL ROUTING

(75) Inventors: Bohdan K. Zabawskyj, Woodbridge (CA); Ben Moore, Victoria (CA)

(73) Assignee: Redknee Inc., Mississauga (CA)

( * ) Notice: Subject to any disclaimer, the term of this patent is extended or adjusted under 35 U.S.C. 154(b) by 781 days.

(21) Appl. No.: 12/674,483

(22) PCT Filed: Nov. 15, 2007

(86) PCT No.: PCT/CA2007/002078
§ 371 (c)(1),
(2), (4) Date: Feb. 22, 2010

(87) PCT Pub. No.: WO2009/023948
PCT Pub. Date: Feb. 26, 2009

(65) Prior Publication Data
US 2012/0002646 A1    Jan. 5, 2012

Related U.S. Application Data

(60) Provisional application No. 60/957,086, filed on Aug. 21, 2007.

(51) Int. Cl.
*H04W 4/00* (2009.01)
(52) U.S. Cl.
USPC .................... 370/338; 455/404.1; 455/414.2; 455/551

(58) Field of Classification Search
USPC .............. 370/352, 401, 338; 455/456.2, 551, 455/414.2, 414.1
See application file for complete search history.

(56) References Cited

U.S. PATENT DOCUMENTS

| | | | |
|---|---|---|---|
| 2007/0032219 A1* | 2/2007 | Rudolf et al. | 455/404.1 |
| 2007/0149243 A1* | 6/2007 | Hwang et al. | 455/551 |
| 2007/0238448 A1* | 10/2007 | Gallagher et al. | 455/414.2 |

FOREIGN PATENT DOCUMENTS

| | | |
|---|---|---|
| WO | 2006095264 A1 | 9/2006 |
| WO | 2007038380 A2 | 4/2007 |

OTHER PUBLICATIONS

European Patent Application No. 07845548.2 Search Report dated Aug. 10, 2010.

* cited by examiner

*Primary Examiner* — Raj Jain
*Assistant Examiner* — Jamaal Henson
(74) *Attorney, Agent, or Firm* — Keating & Bennett, LLP

(57) ABSTRACT

Systems and methods for call routing are provided. Certain aspects disclose a system and method for call routing, where the call can originate from a hybrid mobile device capable of operating on either the traditional core mobile network or on a voice over Internet Protocol network. Regardless of which network is being accessed, the call can be routed to its intended destination. Other aspects disclose a system for providing a location of a hybrid mobile device.

19 Claims, 10 Drawing Sheets

METHOD AND SYSTEM FOR CALL ROUTING

PRIORITY CLAIM

This specification claims priority from U.S. provisional patent application 60/957,086 filed Aug. 21, 2008, the contents of which are incorporated herein by reference.

FIELD

The present application relation generally to telecommunications and more particularly relates to a method and system for call routing.

BACKGROUND

As circuit switched networks are replaced with packet switched networks, call routing methodologies are becoming more complex. Indeed, there is additional complexity in the case of mobile networks, and still further complexity in hybrid mobile networks.

Emergency 911 services are one example where call routing can be complex. In the circuit switched paradigm, 911 services were complicated given that a single telephone number, 911, was used from all telephone handsets to reach multiple emergency service centers, technically known as public safety answering points ("PSAP"). In traditional mobile networks (e.g. Global System for Mobile communications ("GSM"), Code Division Multiple Access ("CDMA")), provision of 911 services were even more complicated as a mobile handset would need to access a different PSAP depending on the location of the handset. More recently hybrid mobile paradigms have arisen, where a mobile handset can access either a traditional mobile network or access a voice over internet protocol ("VOIP") network via access technologies that use unlicensed spectrum such as a wireless local area network ("WLAN") implemented via Bluetooth or Institute of Electrical and Electronic Engineers ("IEEE") Standard 802.11. Collectively, these unlicensed access technologies are also known as Unlicensed Mobile Access (UMA) technologies. In these hybrid mobile paradigms, the selection of the appropriate PSAP based on the location of the caller is even more complex, as the routing of the 911 call can be performed either through the WLAN or via the traditional mobile network, and in either event the location of the calling device needs to be ascertained in order to locate the appropriate PSAP.

U.S. Pat. Nos. 5,805,689, RE36,111 and 5,805,689 provide a routing methodology for 1-800 telephone calls. ("1-800 patents") The patentees of the 1-800 patents assert that the 1-800 patents can be used for 911 services. However, the 1-800 patents require the use of latitude and longitude information for call routing. Yet this can be overly cumbersome particularly in the case of WLAN hotspots, where the individual or entity deploying the WLAN hotspot may not know their particular latitude and longitude. This is a problem that is exacerbated by the fact that the WLAN hotspot may be moved on a frequent basis. Another problem with using the 1-800 patents for 911 services is that in general, the 1-800 patents were constructed for a circuit switched paradigm and are not generally suitable for calls under a packet switched paradigm.

Although call routing in the event of an Emergency Services Call is of paramount importance, a means to route calls originated from a UMA capable mobile device to a given service provider that provides geographically oriented services (e.g. a delivery service, florist, restaurant) is also required.

In addition, an asynchronous mechanism to access the location of the UMA capable mobile device independent of a call routing request is also required for the provision of both physical services (e.g. delivery of goods) and virtual services (e.g. delivery of weather reports).

SUMMARY

An aspect of this specification provides a method for responding to a request for a routing parameter from a network entity for a communication originated from a communication device comprising:

if the communication originates from a first network type, allocating the routing parameter on the basis of a first node identifier associated with a first node being accessed by the calling device; and if the communication originates from a second network type, then if the communication from originates from a second node that has been previously associated with the communication device, then allocating the routing parameter based on either a second node identifier associated with the second node or a communication device identifier;

if the communication from originates from a third node that has not been previously associated with the communication device, and where the third node has been previously identified, then allocating the routing parameter based on a third node identifier associated with the third node; and if the communication from originates from a fourth node that has not been previously associated with the communication device, and where the fourth node has been previously identified, then allocating the routing parameter based on a network address identifying the fourth node.

The first network type can be a mobile network such as a GSM, GPRS, CDMA, or WiMAX network. The second network type can be a UMA network. The UMA network can be a WLAN network.

The second node can be a UMA hotspot located in a subscriber's business or home and the communication device is associated with that subscriber's business or home.

The third node can be a UMA hotspot located in a business or home not associated with the subscriber.

The fourth node can be a UMA hotspot located in a business or home not associated with the subscriber.

The routing key can be an emergency services routing key (ESRK).

The UMA hotspot can be a WLAN hotspot.

Another aspect of this specification provides a method for responding to a request for a location from a network entity of a communication device comprising:

if the request originates from a first network type, interacting with a plurality of network entities in order to retrieve location information using a communication device identifier and triangulation of the communication device;

if the request originates from a second network type, retrieving a known street address associated with the location of a node being accessed by the communication device.

Another aspect of this specification provides a method for responding to a request for location information from a network entity for a communication device comprising:

if the communications device is linked to a first network type, allocating the location information on the basis of a first node identifier associated with a first node being accessed by the communications device; and if the communication device is linked to a second network type, then if the communications device is linked to a second node that has been previously associated with the communication device, then determining the location information based on either a second node identifier associated with the second node or a communication device identifier if the communications device is linked to a third node that has not been previously associated with the communication device, and where the third node has been previously identified, then determining the location information based on a third node identifier associated with the third node; and if the communications device is linked to a fourth node that has not been previously associated with the communication device, and where the fourth node has been previously identified, then determining the location information based on a network address identifying the fourth node.

Another aspect of this specification provides an apparatus for responding to a request for location information from at least one network entity for a communication device comprising an interface for connecting to the network entity. The apparatus also comprises a processor connected to the interface. The processor is configured to determine if the communications device is linked to at least one of a first network type and a second network type, and, if the processor determines the communication device is linked to the first network type then the processor further configured to allocate the location information on the basis of a first node identifier associated with a first node being accessed by the communications device. However, if the processor determines the communication device is linked to a second network type, then the processor is further configured to determine if the communications device is linked to a second node that has been previously associated with the communication device, in which case the processor is configured to determine the location information based on either a second node identifier associated with the second node or a communication device identifier. The processor is further configured to determine if the communications device is linked to a third node that has not been previously associated with the communication device, and where the third node has been previously identified, the processor is configured to determine the location information based on a third node identifier associated with the third node. The processor is further configured to determine if the communications device is linked to a fourth node that has not been previously associated with the communication device, and where the fourth node has been previously identified, the processor is configured to determine the location information based on a network address identifying the fourth node.

Systems and methods for call routing are provided. Certain aspects disclose a system and method for call routing, where the call can originate from a hybrid mobile device capable of operating on either the traditional core mobile network or on a voice over Internet Protocol network. Regardless of which network is being accessed, the call can be routed to its intended destination. Other aspects disclose a system for providing a location of a hybrid mobile device.

DETAILED DESCRIPTION OF THE EMBODIMENTS

Various terms and definitions are used herein. For understanding of the use of these terms, and the structure and function of any associated elements in the Figures, the entirety of the specification should be carefully consulted.

Figure 1:
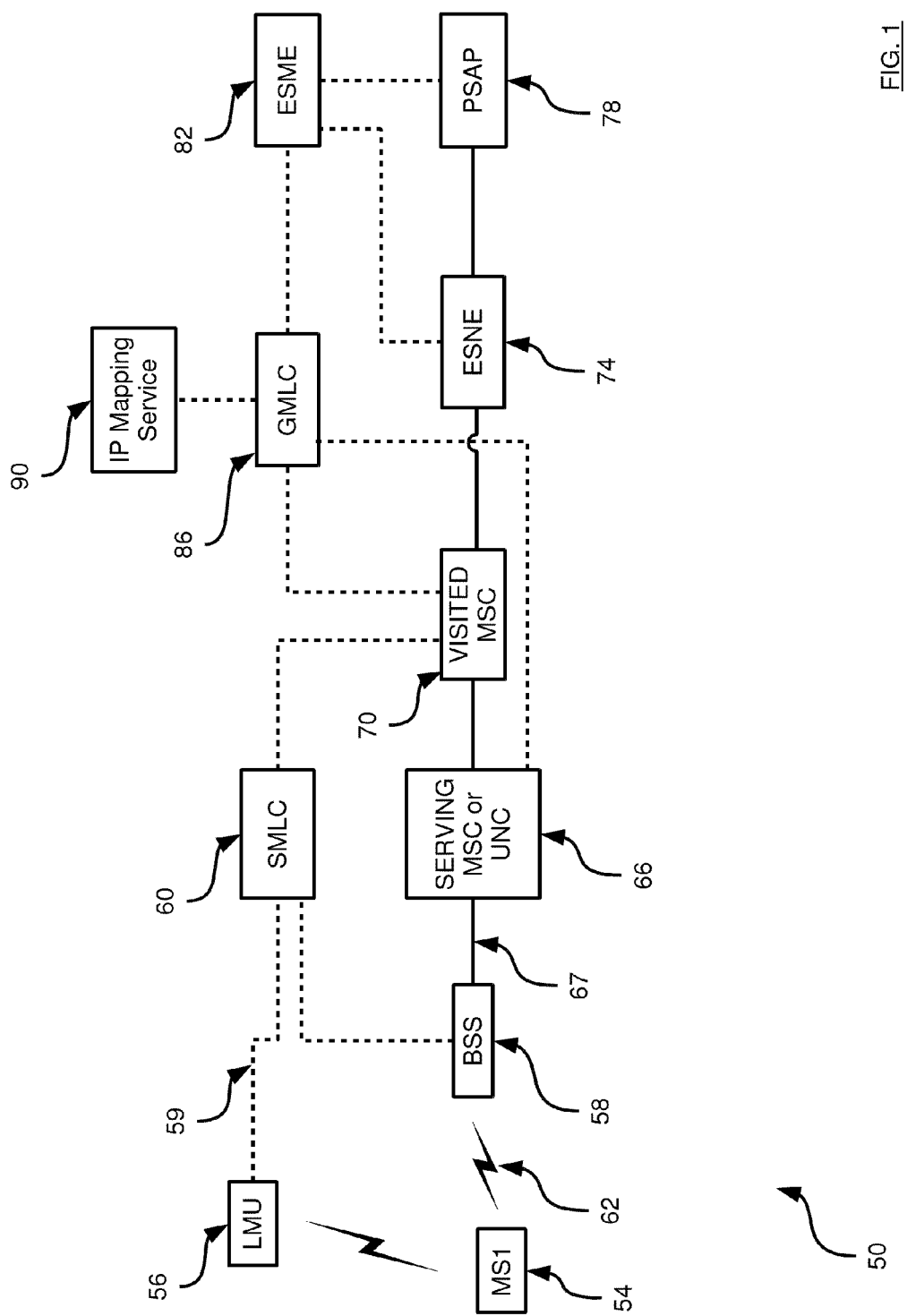
FIG. 1 is a schematic representation of a system for call routing in accordance with an embodiment.

Referring now to FIG. 1, a system for call routing is indicated generally at 50. System 50 comprises a first mobile station ("MS") 54. MS 54 can be any known or future-conceived mobile handset such as a mobile telephone, wireless paging device with telephony capabilities, or the like. MS 54 can conduct voice calls either via core mobile network technologies or via voice over Internet Protocol (VOIP) using wireless local area network (WLAN) technologies.

While in the present embodiment MS 54 is a mobile station, it should be understood that in modified embodiments, the teachings herein can be applied to fixed or nomadic wireless. MS 54 is configured to initiate a telephone call. In a present exemplary embodiment, which will be discussed further below, MS 54 is configured to initiate a telephone call in the form of an Emergency Services Call and can be involved in determining the position of MS 54 depending on the nature of the location technology utilized.

An Emergency Services Call is a call requiring connection to a Public Safety Access Point ("PSAP"). The digits 9-1-1 require this treatment in the United States of America. Note that other digits sequences may be used to invoke an Emergency Services Call.

System 50 also comprises a Location Measurement Unit (LMU) 56 that is configured to make radio measurements to support the determination of a position of MS 54 in conjunction with at least one Serving Mobile Location Center (SMLC) 60 that connects to LMU 56. For non UMA (e.g. GSM) calls, SMLC 60 is configured to manage the overall coordination and scheduling of the resources of LMU 56 that are required to determine the position of MS 54. The mechanism and signalling methods are unique to a given triangulation technology and vendor respective to LMU 56. For some position methods, LMU 56 is also configured to calculate the final position estimate and accuracy. In one Public Land Mobile Network ("PLMN"), there can be more a plurality of SMLCs. Position and assistance measurements obtained by LMU 56 are supplied to a particular SMLC 60 associated with LMU 56. Signaling to LMU 56 can be performed over a link 59. Those skilled in the art will recognize that System 50 may be modified to accommodate alternative access and core network technologies such as CDMA as well as future evolutionary architectural modifications such as the Internet Multimedia Subsystem (IMS) architecture.

System 50 also comprises a Base Station System (BSS) 58. BSS 58 is configured to receive calls from MS 54 via a wireless link 62. BSS 58 is also connected to SMLC 60 and configured to communicate therewith in order to obtain location information about MS 54. In a present, non-limiting embodiment, BSS 58 is based on the Global System for Mobile communication ("GSM") standard for core mobile network calls (and non-VOIP calls) originating from MS 54. In a present, non-limiting embodiment, BSS 58 can also accommodate various VOIP calls using standards and specifications associated with Unlicensed Mobile Access ("UMA") technologies. (UMA is also known as Generic Access Network (GAN), and can provides a means of providing telecommunication services and roaming via an access technology that uses unlicensed spectrum technologies such as Bluetooth or 802.11.)

For both core mobile network calls and VOIP calls from MS 54, BSS 58 is also configured to handle of certain positioning procedures used to determine the position of MS 54, discussed further below.

System 50 also comprises at least one Switching Center (SC) 66 that connects to BSS 58 via a link 67 that is supported by the configuration of each SC 66 and BSS 58. Switching center 66 can be based on the environment of either a mobile switching center (MSC), in the case of core mobile network calls, or an UMA Network Controller ("UNC"), in the case of VOIP calls.

Where SC 66 is an MSC, then such an MSC is based on known core mobile network technologies, and likewise BSS 58 would be based on known core mobile network technologies and MS 54 would be configured to conduct voice calls via known core mobile network technologies.

Where SC 66 is a UNC, then the UNC can be configured to connect to a private or public internet protocol (IP) network (not shown) and to the core mobile network using known gateways and/or interfaces. Such a UNC manages subscriber access to mobile voice and data services from various Wireless Local Area Network (WLAN) locations. Where SC 66 is based on UMA, then BSS 58 would be based on a WLAN router (such as an IEEE 802.11g standard router or a Bluetooth router) and MS 54 would be configured to conduct voice over internet (VOIP) calls via WLAN.

System 50 also comprises a Visited Mobile Switching Center (VMSC) 70 that connects to SC 66 and SLMC 60. The link between the SC and VMSC is based on known core mobile network technologies.

For UMA Emergency Services Calls from MS 54, the UNC-capable SC 66 is configured to initiate a request for an Emergency Services Routing Key (or ESRK, defined below) by sending a query to a GMLC 86 (discussed further below) that can include the following or comparable parameters based on the functionality of the corresponding UMA-capable BSS 58: Mobile Station International Integrated Services Digital Network (ISDN) Number (MSISDN), International Mobile Station Identity (IMSI), Uncertainty Parameter, and Cell Global Identifier (CGI) information. Those skilled in the art will recognize that the GMLC may communicate other parameters and attributes depending on the nature of the access technology or core network technology.

The Mobile Station ISDN or MSISDN is a digit string that normally consists of a dialable sequence that can be used by the PSAP to reach a given mobile subscriber. To the extent that a MSISDN is not available (e.g. for a non-activated phone), a non-dialable MSISDN may be generated by the MSC based on the IMEI or some other attribute.

The International Mobile Equipment Identity or IMEI is a digit string that uniquely identifies a given GSM Mobile Station. The IMEI is a 15 or 17 digit number which includes information on the origin, model, and serial number of the device. The structure of the IMEI is specified in 3GPP TS 23.003.

The International Mobile Station Identity or IMSI is a digit string that uniquely identifies a Subscriber Identification Module (SIM). The SIM is a smart card containing the telephone number (MSISDN) of the subscriber, encoded network identification details, the PIN and other user data such as the phone book. A user's SIM card can be moved from Mobile Station to Mobile Station as it contains all the key information required to activate the Mobile Station.

The Uncertainty Parameter is a digit string that provides an indication of the resolution of the triangulation estimate or approximate radius of a coverage area associated with a Base Station System.

The Cell Global Identity or CGI is a digit string that identifies a cell and sector (as applicable) of a Base Station System (BSS) that serving a subscriber's Mobile Station during an Emergency Services Call. The CGI can be encoded in order to identify the request as being associated with an UMA call.

An Emergency Services Routing Key or ESRK is a digit string that uniquely identifies an ongoing Emergency Services Call. The ESRK is used by the ESNE to direct the call to the appropriate PSAP as well as to correlate location requests from the PSAP to a given Emergency Services Call. Any ESRK so-provided has the following properties:

The ESRK uniquely identifies the emergency services call and its associated MS within the GSM network for at least the duration of the call.

The ESRK can identify the GMLC (defined below) used by the network for communicating with the ESME.

The ESRK may identify an Emergency Services Zone (ESZ).

An Emergency Services Zone or ESZ is a geographic area to which is assigned a primary PSAP, a secondary PSAP, and a set of emergency response agencies (e.g. fire, police, ambulance). The ESZs are non-overlapping and every point in the emergency services area is within one ESZ.

System 50 also comprises at least one Emergency Services Network Entity (ESNE) 74 that connects to VMSC 70. ESNE 74 is a known entity in an emergency services network which serves as the point of interface to an MSC (such as MSC 66) for voice or Telecommunications Device for the Deaf (TDD)/Teletypewriter (TTY) services. ESNE 74 is configured to route and process the voice band portion of an Emergency Services Call. ESNE 74 comprises selective routers (also known as Routing, Bridging and Transfer switches).

System 50 also comprises at least one Public Safety Answering Point (PSAP) 78. (Typically system 50 includes a plurality of PSAPs, but for simplicity and ease of explanation only a single PSAP 78 is shown). PSAP 78 is a known emergency services network element that is responsible for answering Emergency Services Calls. PSAP 78 is a call-center to which Emergency Services Calls are directed. PSAP 78 invokes emergency services as required (e.g. fire, ambulance) as required in response to an Emergency Services Call.

ESNE 74 is configured to route and process the voice band (also referred to in the art as the "bearer path") portion of an Emergency Services Call from MS 54. In the present embodiment, ESNE 74 is configured to direct an Emergency Services Call received from MSC 66 to an appropriate PSAP, in this embodiment PSAP 78, on the basis of an emergency services routing key (ESRK) the details of which will be discussed further below.

System 50 also comprises an Emergency Services Message Entity (ESME) 82. ESME 82 is another entity in the emergency services network which serves as the point of interface to MSC 66 for common channel emergency services messaging. ESME 82 routes and processes the out-of-band messages related to Emergency Services Calls. ESME 82 can be incorporated into selective routers (also known as Routing, Bridging and Transfer switches) and Automatic Location Information (ALI) database engines. ESME 82 is configured to process and direct out-of-band (non-bearer path) messages related to Emergency Services Calls. In the present embodiment, ESME 82 initiates requests to locate a given mobile subscriber that is identified via an ESRK.

System 50 also comprises at least one Gateway Mobile Location Center (GMLC) 86. GMLC 86 is configured to support delivery of the position of MS 54 to ESME 82. GMLC 86 is also configured to handles requests an initial, updated (current), or last known position of MS 54 from ESME 82. In a typical Public Land Mobile Network (PLMN) implementation there can be more than one GMLC.

The GMLC 86 may request the location of a given MS 54 from the VMSC 70. The location received at the GMLC 86 can be stored for subsequent retrieval by the PSAP 78 via the ESME 82. GMLC 86 is discussed further below.

System 50 also comprises a Reverse IP Address Service 90 that is accessible to GMLC 86 and which is based on any service that is configured to identify the region or other geodetic information for a given IP address. Example of Reverse IP Address Services include http://www.ip2location.com/free.asp or http://www.geobytes.com/IpLocator.htm. Other mechanisms to access Reverse IP Address services, Application Programming Interfaces (APIs) may also be used.

For Emergency Services Call origination, MS 54 is configured to interact with a local serving SC 66 and, in some cases, with a separate VMSC 70. Only a single SC 66 is involved (visited and serving MSC) for an Emergency Services Call that is not in MSC-MSC handover state. Two separate MSCs are involved, serving MSC and visited (or anchor) MSC, for an Emergency Services Call in MSC-MSC handover state. The handover state scenario is represented in FIG. 1—and so it should be understood that in non-handover state scenarios VMSC 70 and SC 66 can be abstracted into a single entity as SC 66. Expressed in other words, VMSC 70 is responsible for setting up the Emergency Services Call from MS 54 to the correct PSAP, being PSAP 78 in FIG. 1 with the other PSAPs in the emergency network not being shown. In this embodiment, SC 66 (which in this case is distinct), relays all Emergency Services Call signaling messages between BSS 58 and VMSC 70 using the signalling procedures associated with the core network. To the extent that the MS 54 is in a 'hand-over' state, as shown in FIG. 1, SC 66, which is associated with BSS 58 serving MS 54 is referred to as the Serving MSC—and the MSC that was associated with the BSS that originally served the Mobile Station at the initiation of the call is called the Visited MSC. Recall that in a non hand-over scenario, the VMSC 70 and SC 66 are one and the same.

VMSC 70 provides at least the following two functions:

(i) SC 66 receives Emergency Services Calls via BSS 58 and interacts with GMLC 86 for the purpose of retrieving an ESRK for a given Emergency Services Call. For emergency calls, the VMSC 70 will initiate a request for an ESRK by providing a number of parameters that may include the MSISDN, IMSI, and CGI information or comparable parameters associated with MS 54. Upon receiving the response from GMLC 866, which includes an ESRK value, VMSC 70 will direct the call to ESNE 74.

(ii) VMSC 70 will receive requests to obtain location information of MS 54 from GMLC 86.

a. For non-UMA (e.g. GSM) calls, upon receiving a request from GMLC 86, the VMSC 70 initiates a request to SMLC 60 to triangulate the position of MS 54. Upon receiving the response from SMLC 60, the VMSC 70 provides the triangulation data to GMLC 86.

b. For UMA calls, GMLC 86 will retrieve any stored location information (e.g. a street address) associated with the location of the UMA-capable BSS 58. In certain configurations, GMLC 86 can triangulate the mobile station via the procedure used for non-UMA (e.g. GSM) calls.

For UMA, the UMA-capable BSS 58 will be deployed and provide coverage at a fixed location such as a commercial establishment (e.g. a café) or a residential home. A UMA capable BSS is essentially a wireless access point that uses unlicensed spectrum technologies such as Bluetooth or IEEE 802.11 in order to communicate with a UMA-capable MS 54.

For the deployed configuration, the GMLC 86 provides two functions:

(i) GMLC 86 responds to an ESRK allocation request from the VMSC 70 for MS 54 identified by a MSISDN or IMSI.

i. For non UMA (e.g. GSM) calls, GMLC 86 allocates an ESRK on the basis of the received Cell-site Identifier (as identified via a Cell Global Identity (CGI) parameter) or comparable parameter.

ii. For UMA calls, GMLC 86 will receive a CGI parameter or comparable parameter that identifies the query as being associated with a UMA call. For example, the received CGI parameter may be within a prescribed range of values that will identify the query as being associated with a UMA call. Alternatively, the query may receive information that is unique to a UMA call such as an IP address or MAC address. GMLC 86 will allocate an ESRK as a function of the received information in the query as follows:

a. On the basis of the received CGI parameter and uncertainty parameter or comparable parameters or alternatively from the received MAC address, the call will be determined to be originated from a UMA-capable BSS 58 (e.g. a wireless access point) located at a known subscriber's home or business. GMLC 86 will allocate an ESRK on the basis of the received IMSI, MAC address, or comparable parameter; or b. On the basis of the received CGI parameter and uncertainty parameter or comparable parameters or alternatively from the received MAC address, the call will be determined to be received from a known public wireless IP access point (e.g. a WLAN hot-spot at a book-store). If the MAC address was not received by the GMLC 86, the GMLC 86 will determine the identity of the UNC-capable SC 66 from the CGI parameter associated with the UMA-capable BSS 58 and the GMLC will query the SC 66 in order to retrieve the MAC address for UMA capable BSS 58 at the hot-spot. GMLC 86 will allocate an ESRK on the basis of the received MAC address; or c. On the basis of the received CGI parameter and uncertainty parameter or comparable parameters or alternatively on the basis of the received MAC or IP address, the call will be determined to be received from an unknown public or private wireless IP access point (e.g. a WLAN hot-spot at the residence of an associate of the UMA subscriber). If the IP address was not received by the GMLC 86, the GMLC 86 will determine the UNC-capable BSS 58 from the CGI parameter or MAC address or comparable parameter and query the UNC-capable BSS 58 in order to retrieve the IP address associated with the UMA call. GMLC 86 will use a reverse IP address service 90 to determine the region (e.g. city name, postal code) associated with the UMA call. GMLC 86 will allocate an ESRK on the basis of the received region information.

iii. Note that a given ESRK is associated with a given Public Safety Answering Point (PSAP). Note that while an ESRK is allocated to a given mobile subscriber for the duration of an Emergency Services Call, the GMLC provides a correlation function between an ESRK the MSISDN and IMSI or comparable parameters associated with the mobile subscriber.

(ii) The GMLC also responds to requests to provide location information for mobile subscribers received from the ESME. The GMLC handles requests for a mobile subscriber's initial, updated (current), or last known position from the ESME. A given Emergency Services Call is identified via an ESRK.

i. For non-UMA (e.g. GSM) calls, in order to undertake the location retrieval function, the GMLC 86 will interact with the Serving/Visited MSC in order to retrieve location information. The GMLC 86 initiates a location retrieval request via the Serving/Visited MSC prior to receiving a location request from the ESME 82. In the location retrieval request to the Serving/Visited MSC, the GMLC 86 will identify the Mobile Station via the MSISDN and/or IMSI or comparable parameter. The Serving/Visited MSC will in turn interact with the BSS and/or SMLC in order to triangulate the subscriber's Mobile Station.

ii. For UMA calls, the GMLC 86 may retrieve the street address associated with the location of the known UMA BSS station (e.g. the residential or business address associated with a given subscriber) if available. In certain configurations, the GMLC 86 may attempt to determine the location of the MS 54 using the procedures described in J-STD-036—"Enhanced Wireless 9-1-1 Phase 2" and provide the location information to the PSAP.

Figure 2:
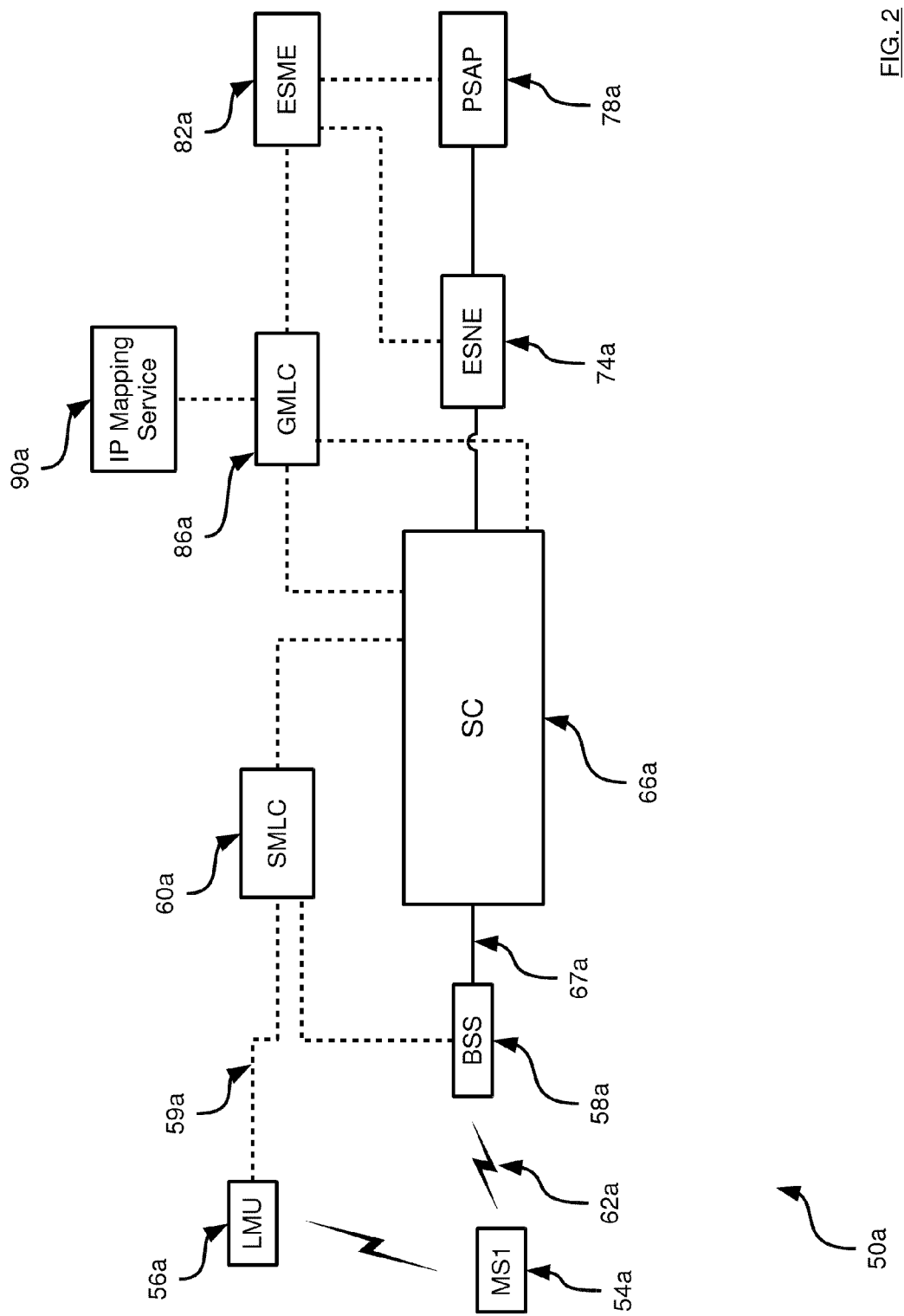
FIG. 2 is a schematic representation of a system for call routing in accordance with another embodiment.

Referring now to FIG. 2, a system for call routing is indicated generally at 50a. System 50a is a variation on system 50 and therefore like elements in system 50a bear like references to elements in system 50, except that in system 50a references are followed by the suffix "a". Of note, however, is that in system 50a VMSC 70 is omitted and abstracted into a single SC 66a. This variation was discussed above in relation to FIG. 1 and is now shown expressly here in FIG. 2.

Figure 3:
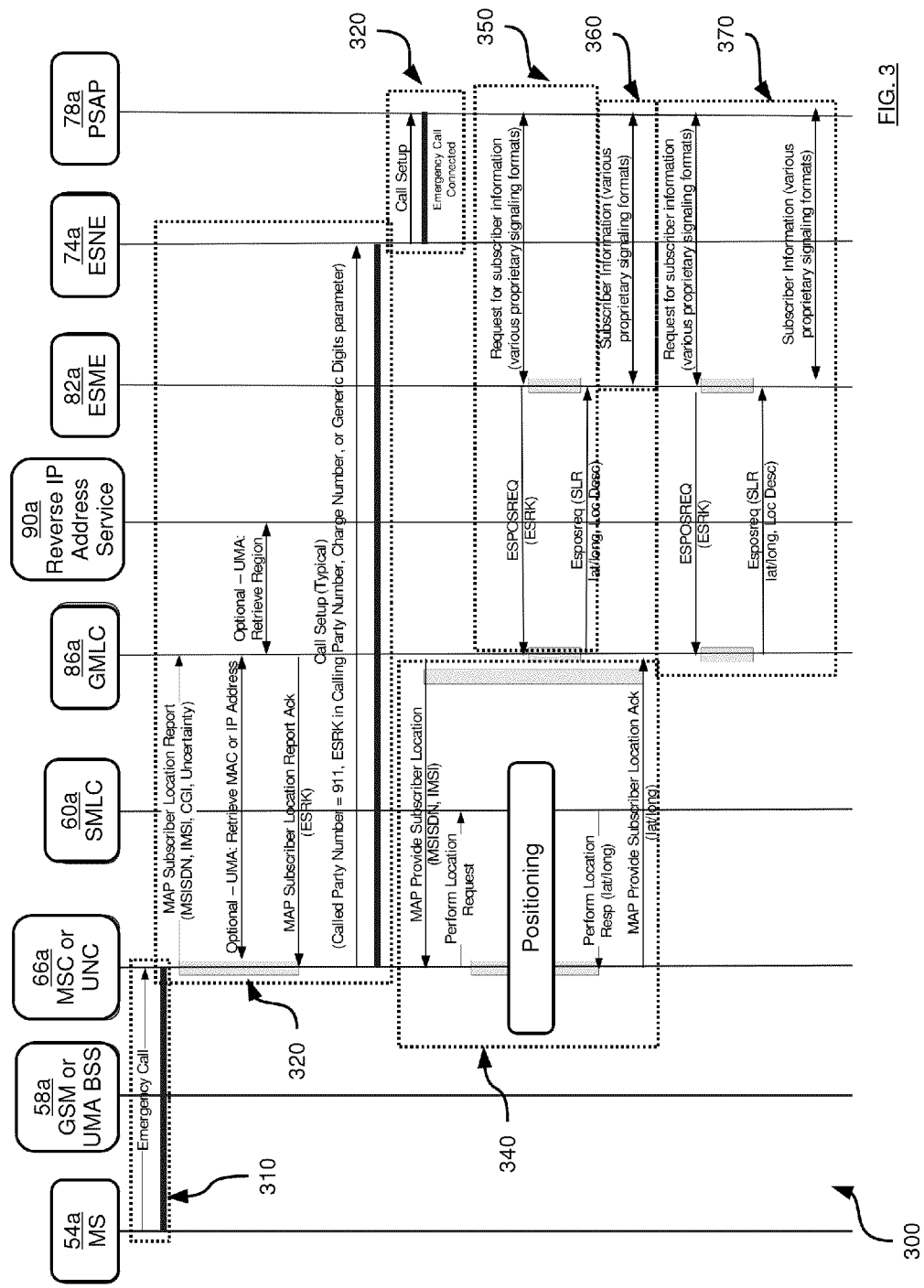
FIG. 3 is a call flow diagram that can be performed on the system for call routing of FIG. 2.

Referring now to FIG. 3, a method for call routing is depicted in the form of a call flow diagram and indicated generally at 300. Method 300 is presented for operation in conjunction with system 50a, and system 50a can be better understood by the following discussion of method 300, and vice versa. It should be understood, however, that both system 50a and method 300 can be modified. Method 300 in particular presents a call flow diagram for routing of E911 Traffic. Various processing blocks are identified in FIG. 3 within boxes denoted by dotted-lines. Those blocks are discussed further below.

Beginning at block 310, a mobile subscriber initiates an Emergency Services Call via MS 54a.

At block 320, the Emergency Services Call is received by SC 66a via BSS 58a.

For calls relative to block 320, the MSC-capable SC 66a will initiate a request to GMLC 86a to provide an ESRK for the Emergency Services Call. The request will include the MSISDN, IMSI, and CGI or comparable parameters. GMLC 86a allocates an ESRK on the basis of the received CGI or comparable parameter.

For UMA Calls relative block 320, the UNC-capable SC 66a initiates a request to GMLC 86 to provide an ESRK for the Emergency Services Call. The request will include the MSISDN, IMSI, Uncertainty Value, and CGI or comparable parameters. GMLC 86a will identify the query as being associated with a UMA call on the basis of the received CGI or comparable parameter. For example, the received CGI parameter may be within a prescribed range of values that will identify the query as being associated with a UMA call. Alternatively, the query may receive information that is unique to a UMA call such as an IP address or MAC address. GMLC 86a will allocate an ESRK as a function of the received information in the query as follows:

a. On the basis of the received CGI parameter and uncertainty parameter or comparable parameters or alternatively from the received MAC address, the call will be determined to be originated from a UMA-capable BSS 58a (e.g. a wireless access point) located at a known subscriber's home or business. GMLC 86a will allocate an ESRK on the basis of the received IMSI, MAC address, or comparable parameter; or b. On the basis of the received CGI parameter and uncertainty parameter or comparable parameters or alternatively from the received MAC address, the call will be determined to be received from a known public wireless IP access point (e.g. a WLAN hot-spot at a book-store). If the MAC address was not received by the GMLC 86a, the GMLC 86a will determine the identity of the UNC-capable SC 66a from the CGI parameter associated with the UMA-capable BSS 58 and the GMLC 86a will query the SC 66a in order to retrieve the MAC address for UMA capable BSS 58a at the hot-spot. GMLC 86a will allocate an ESRK on the basis of the received MAC address; or c. On the basis of the received CGI parameter and uncertainty parameter or comparable parameters or alternatively on the basis of the received MAC or IP address, the call will be determined to be received from an unknown public or private wireless IP access point (e.g. a WLAN hot-spot at the residence of an associate of the UMA subscriber). If the IP address was not received by the GMLC 86a, the GMLC 86a will determine the UNC-capable BSS 58a from the CGI parameter or MAC address or comparable parameter and query the UNC-capable BSS 58a in order to retrieve the IP address associated with the UMA call. GMLC 86a will use a reverse IP address service 90a to determine the region (e.g. city name, postal code) associated with the UMA call. GMLC 86a will allocate an ESRK on the basis of the received region information.

Upon receiving the ESRK from GMLC 86a, SC 66a will direct the Emergency Services Call to ESNE 74a.

Annex D of J-STD-036—"Enhanced Wireless 9-1-1 Phase 2" ("Standard") governs one way in which how SC 66a can send the call to ESNE 74a. According to the Standard, when SC 66a sends the call to ESNE 74a, there are several ways that SC 66a can populate the Signaling System Number 7 ("SS7") parameters with the ESRK. For example, the SS7 parameters are typically populated as follows: the destination address (the Called Party Number parameter) will be populated with '911' ('11' or '1' may also be used) while the ESRK will populate one or more of the Calling Party Number parameter, Charge Number parameter, or Generic Digits parameter—depending on the capabilities of PSAP 78a as well as the availability of other information such as the MSISDN. As another less common example in the Standard, the SS7 parameters are populated as follows: the Called Party Number parameter is populated with the ESRK, while the Calling Party Number parameter is populated with the MSISDN, and the other SS7 parameters are populated in the usual manner. The choices that are made regarding populating the SS7 parameters are based on a variety of needs of the specific infrastructure carrying the call, including the capabilities of the other elements in the infrastructure, including SC 66*a*, ESME 82*a*, ESNE 74*a* and PSAP 78*a* as well as the availability of other information such as the MSISDN.

At block 330, ESNE 74*a*, upon receiving an Emergency Services Call, will direct the call to the appropriate PSAP (PSAP 78*a* being the exemplary provided in FIGS. 2 and 3) on the basis of the received ESRK. The Emergency Services Call between the MS 54*a* and PSAP 78*a* is now connected and the subscriber of MS 54*a* can speak with the emergency response personnel at PSAP 78*a*.

At block 340, location information for MS 54*a* is obtained. For non-UMA (e.g. GSM) calls relative to block 340, GMLC 86*a* initiates a request to the MSC-capable SC 66*a* in order to retrieve location information for MS 54*a* associated with the Emergency Services Call. GMLC 86*a* uses the MSISDN and/or IMSI previously provided in the request message to the MSC-capable SC 66*a*. In turn, MSC-capable SC 66*a* requests the location information from SMLC 60*a*. Once MSC-capable SC 66*a* receives the location information from SMLC 60*a*, the MSC-capable SC 66*a* provides that location information to GMLC 86*a*.

For UMA calls relative to block 340, in certain configurations, GMLC 86*a* may attempt to triangulate the MS 54*a* using the procedures described in J-STD-036—"Enhanced Wireless 9-1-1 Phase 2" (for example, if the MS 54*a* is both UMA capable and GSM capable).

At block 350, PSAP 78*a*, via ESME 82*a*, requests location data for MS 54*a* from GMLC 86*a* by using the ESRK associated with the Emergency Services Call. GMLC 86*a* passes-along the location information obtained from the SC 66 from block 320 or 340 to ESME 82*a*. For UMA calls relative to block 350, GMLC 86*a* may retrieve the street address associated with the location of any known UMA-capable BSS 58*a* (e.g. the residential or business address associated with a given subscriber), of course assuming that such address is in fact known.

At block 360, PSAP 78*a* retrieves the location information for MS 54*a* from ESME 82*a*.

At block 370, during the course of the Emergency Services Call, PSAP 78*a* may invoke additional location retrieval requests via ESME 82*a*. These location requests are processed by GMLC 86*a* in substantially the same manner as block 340.

Figure 4:
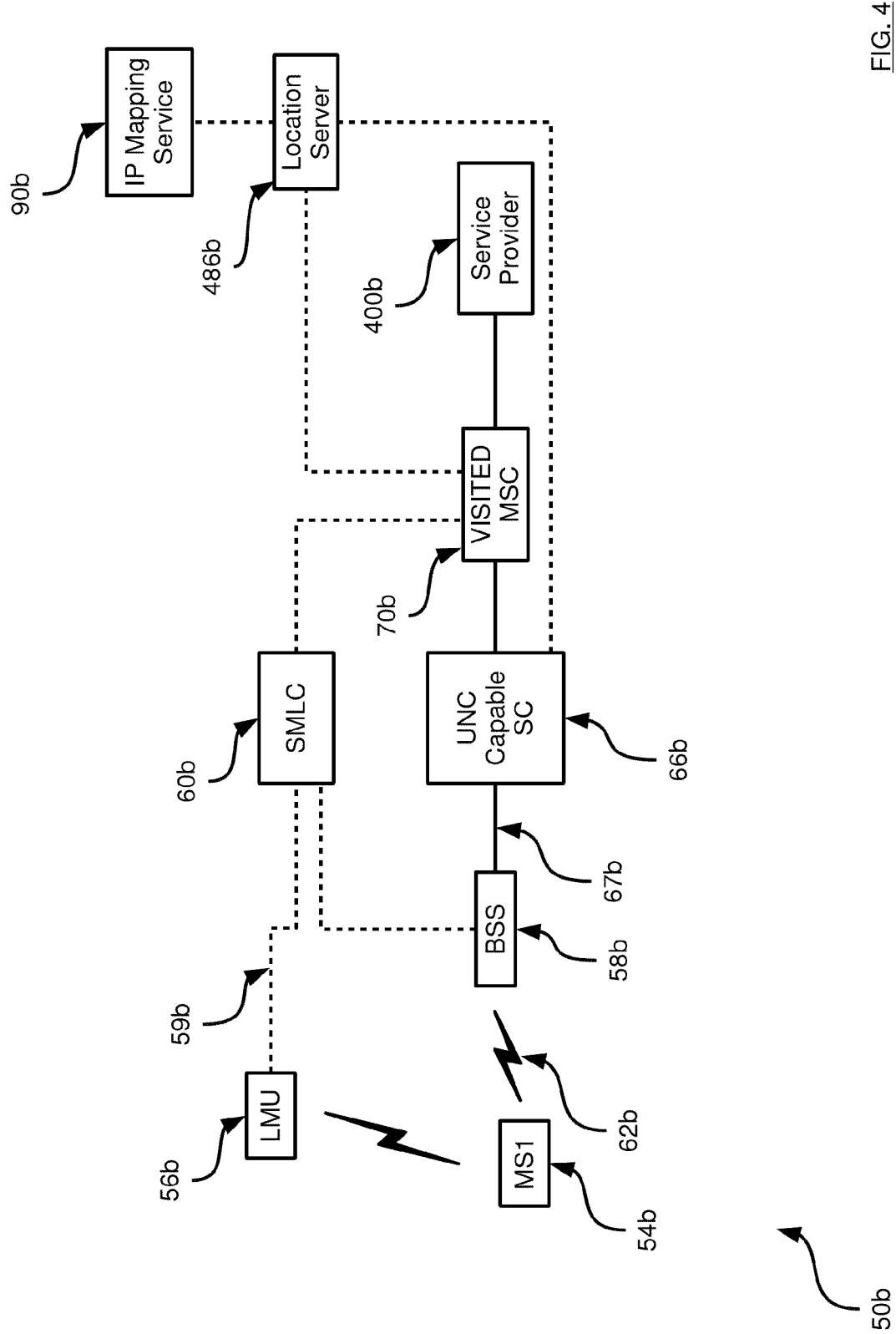
FIG. 4 is a schematic representation of a system for call routing in accordance with another embodiment.

Referring now to FIG. 4, a system for call routing is indicated generally at 50*b*. System 50*b* is a variation on system 50 and therefore like elements in system 50*b* bear like references to elements in system 50, except that in system 50*b* references are followed by the suffix "b". Of note, however, is that in system 50*b* the various emergency services elements are omitted and replaced by a single reference to a service provider 400*b*. System 50*b* is thus directed to routing of VOIP calls in a generic context, non-specific to emergency services.

Also of note is that in system 50*b* is that GMLC 86 is replaced by a location server 486*b*. Location server 486*b* is configured to determine the optimal route for a UMA originated call in response to a query from the UNC-capable SC 66*b*. The query can be encoded in various formats. Those skilled in that art will recognize that the query can be encoded in a format consistent with the Customized Applications for Mobile enhanced Logic (CAMEL) protocol as specified by the 3GPP or Wireless Intelligent Network (WIN) protocol as specified by the 3GPP2 as well as other variants.

For UMA calls, in addition to the called party number, location server 486*b* will receive a CGI or comparable parameter that will identify the query as being associated with an UMA call. For example, the received CGI parameter may be within a prescribed range of values that will identify the query as being associated with a UMA call. Alternatively, the query may receive information that is unique to a UMA call such as an IP address or MAC address. Location server 486*b* will allocate a destination address, which is a digit string that identifies a termination point that can be accessed via the Public Switched Telephone Network. The Destination Address is typically encoded in E.164 format as prescribed by the International Telecommunication Union (ITU) The destination address is associated with the service provider 400*b* as a function of the received information in the query as follows:

a. On the basis of the received CGI parameter and uncertainty parameter or comparable parameters or alternatively from the received MAC address, the call will be determined to be originated from a UMA-capable BSS 58*b* (e.g. a wireless access point) located at a known subscriber's home or business. Location Server 486*b* will allocate a destination address on the basis of the received IMSI, MAC address, or comparable parameter as well as the calling party address; or b. On the basis of the received CGI parameter and uncertainty parameter or comparable parameters or alternatively from the received MAC address, the call will be determined to be received from a known public wireless IP access point (e.g. a WLAN hot-spot at a book-store). If the MAC address was not received by the Location Server 486*b*, the Location Server 486*b* will determine the identity of the UNC-capable SC 66*b* from the CGI parameter associated with the UMA-capable BSS 58*b* and the Location Server 486*b* will query the SC 66*b* in order to retrieve the MAC address for UMA capable BSS 58*b* at the hot-spot. Location Server 486*b* will allocate a destination address on the basis of the received MAC address, or comparable parameter as well as the calling party address; or c. On the basis of the received CGI parameter and uncertainty parameter or comparable parameters or alternatively on the basis of the received MAC or IP address, the call will be determined to be received from an unknown public or private wireless IP access point (e.g. a WLAN hot-spot at the residence of an associate of the UMA subscriber). If the IP address was not received by the Location Server 486*b*, the Location Server 486*b* will determine the UNC-capable BSS 58*a* from the CGI parameter or MAC address or comparable parameter and query the UNC-capable BSS 58*b* in order to retrieve the IP address associated with the UMA call. Location Server 486*b* will use a reverse IP address service 90*b* to determine the region (e.g. city name, postal code) associated with the UMA call. Location Server 486*b* will allocate a destination number on the basis of the received region information as well as the calling party address.

Those skilled in the art will recognize that the allocation of the destination address can be made on other attributes including the originating address (MSISDN), the time of day or day of the week. Those skilled in the art will recognize that the allocation of the destination address can be made by algorithmic means in order to allocate the calls among several terminating numbers associated with Service provider 400*b*. The response to UNC-capable SC 66*b* will include the destination address of the Service provider 400*b*.

Those skilled in the art will now appreciate that system 50*b* is an embodiment focused on VOIP technology. It is to be understood that system 50*b* can be combined wither other embodiments herein that are focused on core mobile network technology to provide a hybrid system that is capable of serving an MS having capable of both core mobile network connectivity and VOIP connectivity.

Figure 5:
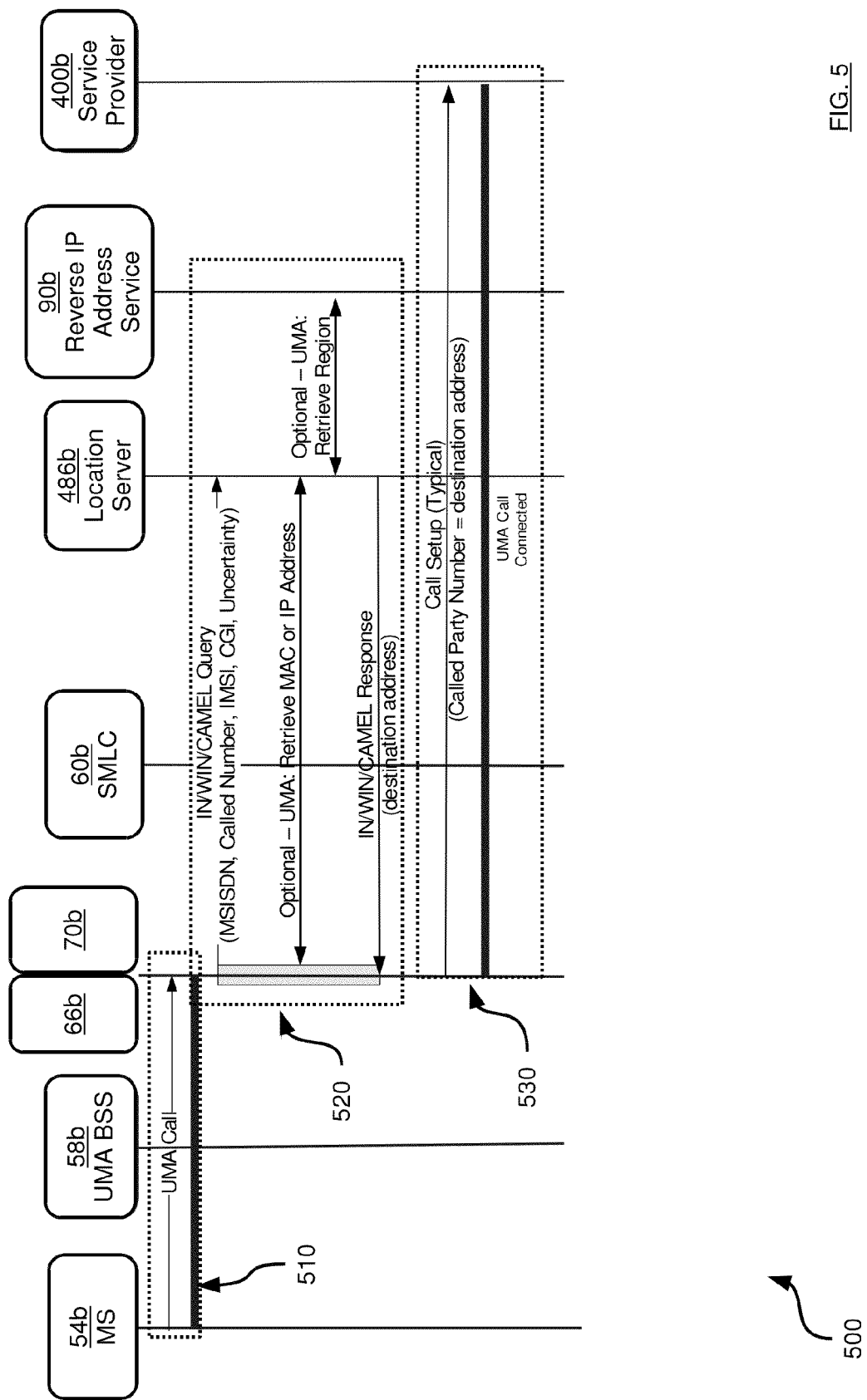
FIG. 5 is a call flow diagram that can be performed on the system for call routing of FIG. 5.

Referring now to FIG. 5, a method for call routing is depicted in the form of a call flow diagram and indicated generally at 500. Method 500 is presented for operation in conjunction with system 50*b*, and system 50*b* can be better understood by the following discussion of method 500, and vice versa. It should be understood, however, that both system 50*b* and method 500 can be modified. Method 500 in particular presents a call flow diagram for routing UMA calls. Various processing blocks are identified in FIG. 5 within boxes denoted by dotted-lines. Those blocks are discussed further below.

At block 510, a mobile subscriber initiates an UMA call via from MS 54*b*.

At block 520, the call is received by the UNC-capable SC 66*b* via BSS 58*b*. The UNC-capable SC 66*b* will initiate (via, in this embodiment, VMSC 70*b*) a request to location server 486*b* to provide a destination address for the call. In this exemplary embodiment, it is assumed that the UNC-capable SC 66*b* cannot query location server 486*b*, and therefore the UNC-capable SC 66*b* will route the call to VMSC 70*b* which can query location server 486*b*. The query can be encoded in various formats. Those skilled in that art will recognize that the query can be encoded in a format consistent with the Customized Applications for Mobile enhanced Logic (CAMEL) protocol as specified by the 3GPP or Wireless Intelligent Network (WIN) protocol as specified by the 3GPP2 as well as other variants. The request will include the MSISDN, Called Number, IMSI, Uncertainty Value, and CGI or comparable parameters.

In addition to the called party number, location server 486*b* will receive a CGI or comparable parameter that will identify the query as being associated with an UMA call. For example, the received CGI parameter may be within a prescribed range of values that will identify the query as being associated with a UMA call. Alternatively, the query may receive information that is unique to a UMA call such as an IP address or MAC address. Location server 486*b* will allocate a destination address associated with service provider 400*b* as a function of the received information in the query as follows:

a. On the basis of the received CGI parameter and uncertainty parameter or comparable parameters or alternatively from the received MAC address, the call will be determined to be originated from a UMA-capable BSS 58*b* (e.g. a wireless access point) located at a known subscriber's home or business. Location Server 486*b* will allocate a destination address on the basis of the received IMSI, MAC address, or comparable parameter as well as the calling party address; or b. On the basis of the received CGI parameter and uncertainty parameter or comparable parameters or alternatively from the received MAC address, the call will be determined to be received from a known public wireless IP access point (e.g. a WLAN hot-spot at a book-store). If the MAC address was not received by the Location Server 486*b*, the Location Server 486*b* will determine the identity of the UNC-capable SC 66*b* from the CGI parameter associated with the UMA-capable BSS 58*b* and the Location Server 486*b* will query the SC 66*b* in order to retrieve the MAC address for UMA capable BSS 58*b* at the hot-spot. Location Server 486*b* will allocate a destination address on the basis of the received MAC address, or comparable parameter as well as the calling party address; or c. On the basis of the received CGI parameter and uncertainty parameter or comparable parameters or alternatively on the basis of the received MAC or IP address, the call will be determined to be received from an unknown public or private wireless IP access point (e.g. a WLAN hot-spot at the residence of an associate of the UMA subscriber). If the IP address was not received by the Location Server 486*b*, the Location Server 486*b* will determine the UNC-capable BSS 58*b* from the CGI parameter or MAC address or comparable parameter and query the UNC-capable BSS 58*b* in order to retrieve the IP address associated with the UMA call. Location Server 486*b* will use a reverse IP address service 90*b* to determine the region (e.g. city name, postal code) associated with the UMA call. Location Server 486*b* will allocate a destination number on the basis of the received region information as well as the calling party address.

Those skilled in the art will recognize that the allocation of the destination address can be made on other attributes including the originating address (MSISDN), time of day or day of the week. Those skilled in the art will recognize that the allocation of the destination address can be made by algorithmic means in order to allocate the calls among several terminating numbers associated with the Service Provider. The response to the SC 66*b* will include the destination address of service provider 400*b*.

At block 530, SC 66*b*, upon receiving the response from the Location Server, will direct the call to the appropriate service provider 400*b* on the basis of the received destination address.

Figure 6:
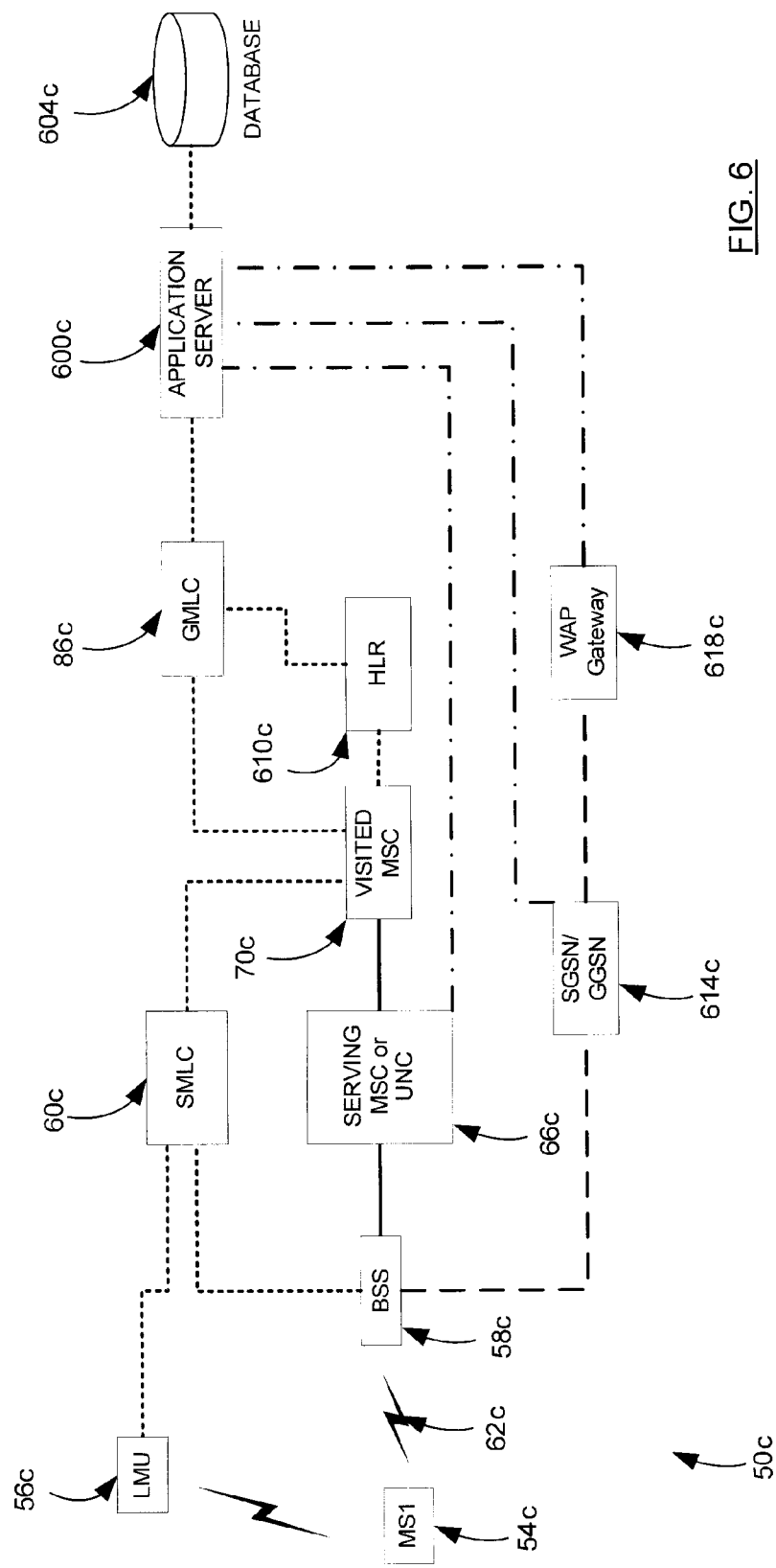
FIG. 6 is a schematic representation of a system for call routing in accordance with another embodiment.

Referring now to FIG. 6, a system for providing location services is indicated generally at 50*c*. System 50*c* is a variation on system 50 and therefore like elements in system 50*c* bear like references to elements in system 50, except that in system 50*c* references are followed by the suffix "c". Of note, however, is that where system 50*a* is directed to call routing, system 50*c* is more principally directed to providing location services, though upon providing such location it is possible to effect call routing. Also of note is that unlike system 50*a*, system 50*c* includes an application server 600*c*. Application server 600*c* is source of location requests, whereby the location of MS 54*c* is requested. Application server 600*c* hosts a location based service that requires location information. An example of such a service includes a restaurant locating service, which is configured to locate a restaurant that is near the present location of MS 54*c*. Application server 600*c* thus is also connected to a database 604*c* which includes relevant data to support the location service. Continuing with the exemplary service, database 604*c* would include restaurant listings and locations therefor, such listings being accessible by application server 600*c*.

Also of note is that system 50*c* includes a home location register 610*c* (HLR) that connects to VMSC 70*c*. Those skilled in the art will recognize that HLR 610*c* is a central database that contains details of each mobile subscriber that is authorized to use the mobile network. For each subscriber that may be identified via an identifier such as an International Station Mobile Identity (IMSI) or comparable parameter, HLR 610*c* retains subscription information including the MSISDN as well as subscribed features (e.g. call forwarding). The VMSC 70c interact with HLR 610c in order to authenticate and register a given Mobile Station (such as MS 54c) as it is activated.

System 50c also includes at least one Serving GPRS Support Node/Gateway GPRS Support Node (SGSN/GGSN) 614c. A Serving GPRS Support Node (SGSN) delivers data packets from and to the mobile devices within its geographical service area. Its tasks include packet routing and transfer, mobility management (attach/detach and location management), logical link management, and authentication and charging functions. The location register of the SGSN stores location information (e.g., current cell, current VLR) and user profiles (e.g., IMSI, address(es) used in the packet data network) of all GPRS users registered with this SGSN. A gateway GPRS support node (GGSN) acts as an interface between the GPRS backbone network and the external packet data networks (radio network and the IP network). It converts the GPRS packets coming from the SGSN into the appropriate packet data protocol (PDP) format (e.g. IP or X.25) and sends them out on the corresponding packet data network. In the other direction, PDP addresses of incoming data packets are converted to the address of the destination. The readdressed packets are sent to the responsible SGSN. For this purpose, the GGSN stores the current SGSN address of the user and his or her profile in its location register. Those skilled in the art will recognize that comparable IP network nodes associated with comparable mobile network architectures would include Packet Data Serving Nodes (PDSN) associated with CDMA networks or Access Service Network Gateways associated with WiMAX networks as well as future evolutionary architectural modifications such as the Internet Multimedia Subsystem (IMS) architecture.

System 50c also includes a Wireless Application Protocol (WAP) gateway 618c that may optionally be used to relay traffic between a given Mobile Station 54c and the application server 600c via an IP network (not shown). A WAP gateway optionally proxies and translates traffic between mobile devices using the WAP or Wireless Markup Language (WML) protocol and HTTP or comparable IP protocols.

The Serving MSC or UNC 66c, SGSN/GGSN 614c, or WAP Gateway 618c will communicate with the Application Server 600c via an intranet or internet IP based network (not shown) for the purpose of enabling IP connectivity with the Mobile Station 54c.

BSS 58c is substantially the same as one or more of BSS 58, 58a and/or 58b as previously described. In general, BSS 58c provides radio-based connectivity to MS 54c.

GMLC 86c, for system 50c, is configured to respond to location queries received via supported Application Programming Interfaces (APIs), which in turn are usable by application server 600c. GMLC 86c specifically interacts with the network operator's infrastructure (HLR 610c and VMSC 70c) in order to retrieve location information with the requested accuracy level. The mechanisms and signalling procedures that are used by GLMC 86c in order to retrieve location information are described in 3GPP TS03.71 and 3GPP TS 09.02.

Figure 7:
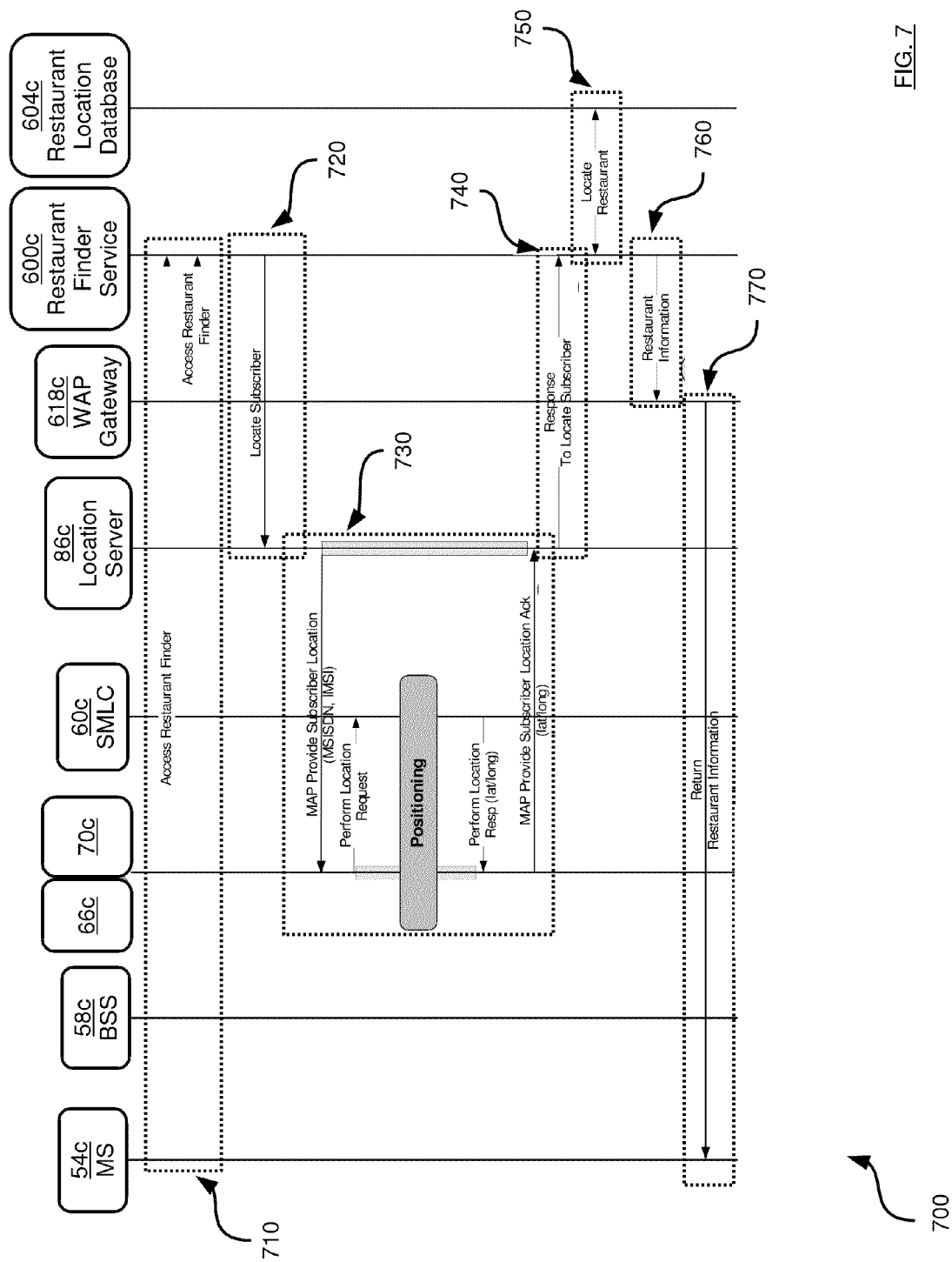
FIG. 7 is a call flow diagram that can be performed on the system for call routing of FIG. 6.

Referring now to FIG. 7, a method for call routing is depicted in the form of a call flow diagram and indicated generally at 700. Method 700 is presented for operation in conjunction with system 50c, and system 50c can be better understood by the following discussion of method 700, and vice versa. It should be understood, however, that both system 50c and method 700 can be modified. Method 700 in particular presents a call flow diagram for providing location services. Various processing blocks are identified in FIG. 7 within boxes denoted by dotted-lines. Those blocks are discussed further below. Method 700 assumes that application server 600c runs the exemplary restaurant finder application as previously discussed, but it is to be reemphasized that this is merely an example.

At block 710, MS 54c initiates a request for a restaurant from restaurant finder application server 600c.

At block 720, restaurant finder application server 600c sends a request to GMLC 86c to provide the location of the MS 54c.

At block 730, GMLC 54c initiates a request to VMSC 70c in order to retrieve information location about MS 54c. The GMLC will use the MSISDN and/or IMSI or comparable previously provided in the request message to the VMSC 70c. In turn, VMSC 70c will request the location information from SMLC 60c. Once VMSC 70c receives the location information from SMLC 60c, the VMSC 70c will provide that location information to GMLC 86c.

At block 740, GMLC 86c will pass along the location information obtained from the VMSC 70c from block 730 to restaurant finder application server 600c.

At block 750, restaurant finder application server 600c accesses restaurant location database 604c to locate a restaurant pursuant to the request from MS 54c and the location information obtained at step 730.

At block 760, restaurant information application server 600c returns the restaurant obtained at block 750 to WAP gateway 618c.

At block 770, the restaurant information is returned to MS 54c.

Figure 8:
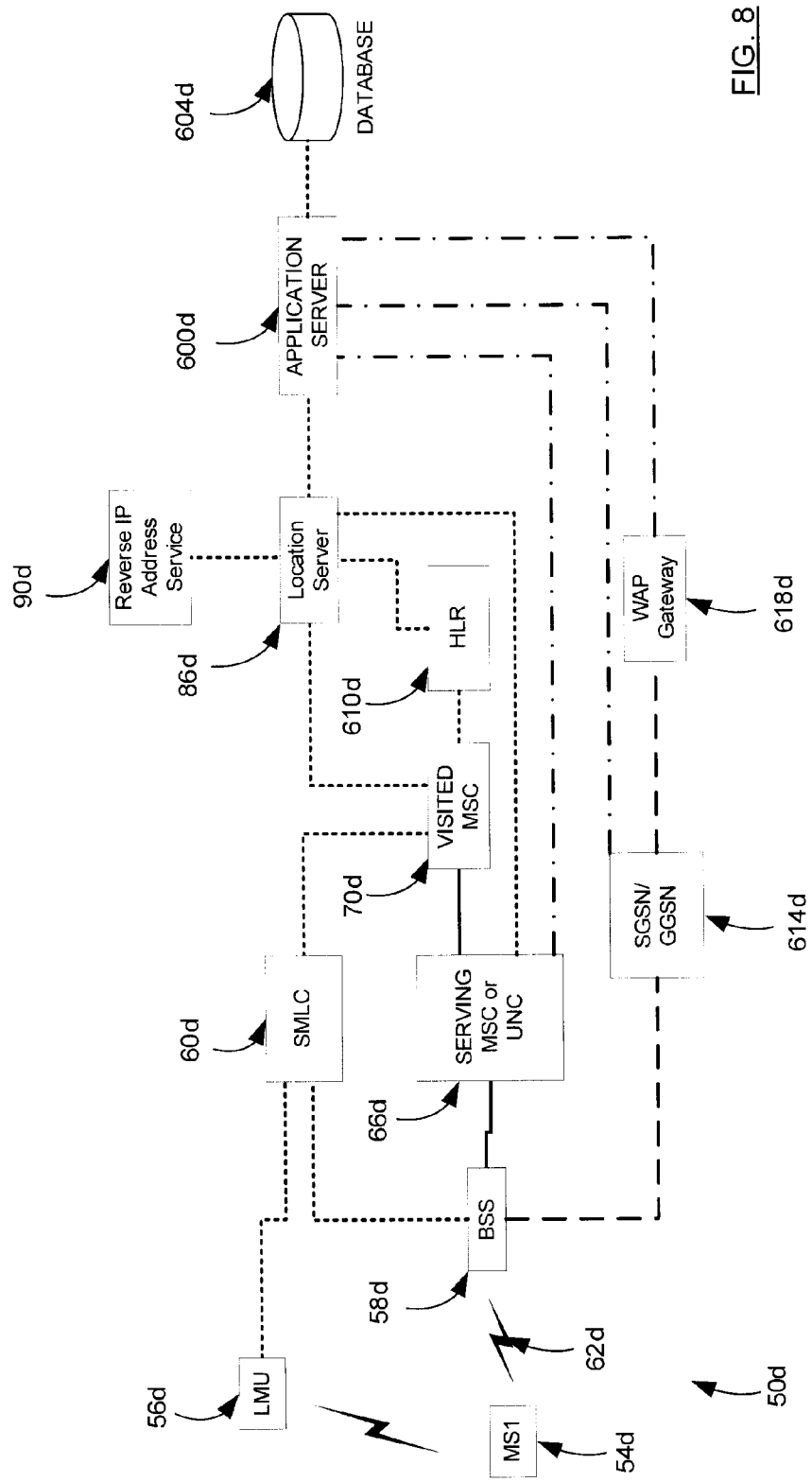
FIG. 8 is a schematic representation of a system for call routing in accordance with another embodiment.

Referring now to FIG. 8, a system for providing location services is indicated generally at 50d. System 50c is also a variation on foregoing embodiments of system 50 and therefore like elements in system 50c bear like references, except that in system 50d references are followed by the suffix "d". Of note, however, is that where system 50a is directed to call routing, system 50d (like system 50c) is more principally directed to providing location services, though upon providing such location it is possible to effect call routing. Also of note is that unlike system 50a, system 50d includes an application server 600d. Also of note is that where system 50c is direct to core mobile network technologies, system 50d is directed to UMA technologies. Application server 600d is a source of location requests, whereby the location of MS 54d is requested. Application server 600c hosts a location-based service that requires location information. An example of such a service includes a restaurant locating service, which is configured to locate a restaurant that is near the present location of MS 54d. Application server 600d thus is also connected to a database 604d which includes relevant data to support the location service. Continuing with the exemplary service, database 604d would include restaurant listings and locations therefor, such listings being accessible by application server 600d.

The Serving MSC or UNC 66d, SGSN/GGSN 614d, or WAP Gateway 618d will communicate with the Application Server 600d via an intranet or internet IP based network (not shown) for the purpose of enabling IP connectivity with the Mobile Station 54d.

As previously discussed, system 50c is an embodiment focused on core mobile network technology, such as GSM technology, whereas system 50d is an embodiment focused on VOIP technology. But it is to be understood that system 50c and system 50d can be combined to provide a hybrid system that is capable of serving an MS having capable of both core mobile network connectivity and VOIP connectivity. Indeed, it should be understood that systems 50, 50a, 50b, 50c, 50d can all be modified and/or combined to provide desired hybrid functionality.

Figure 9:
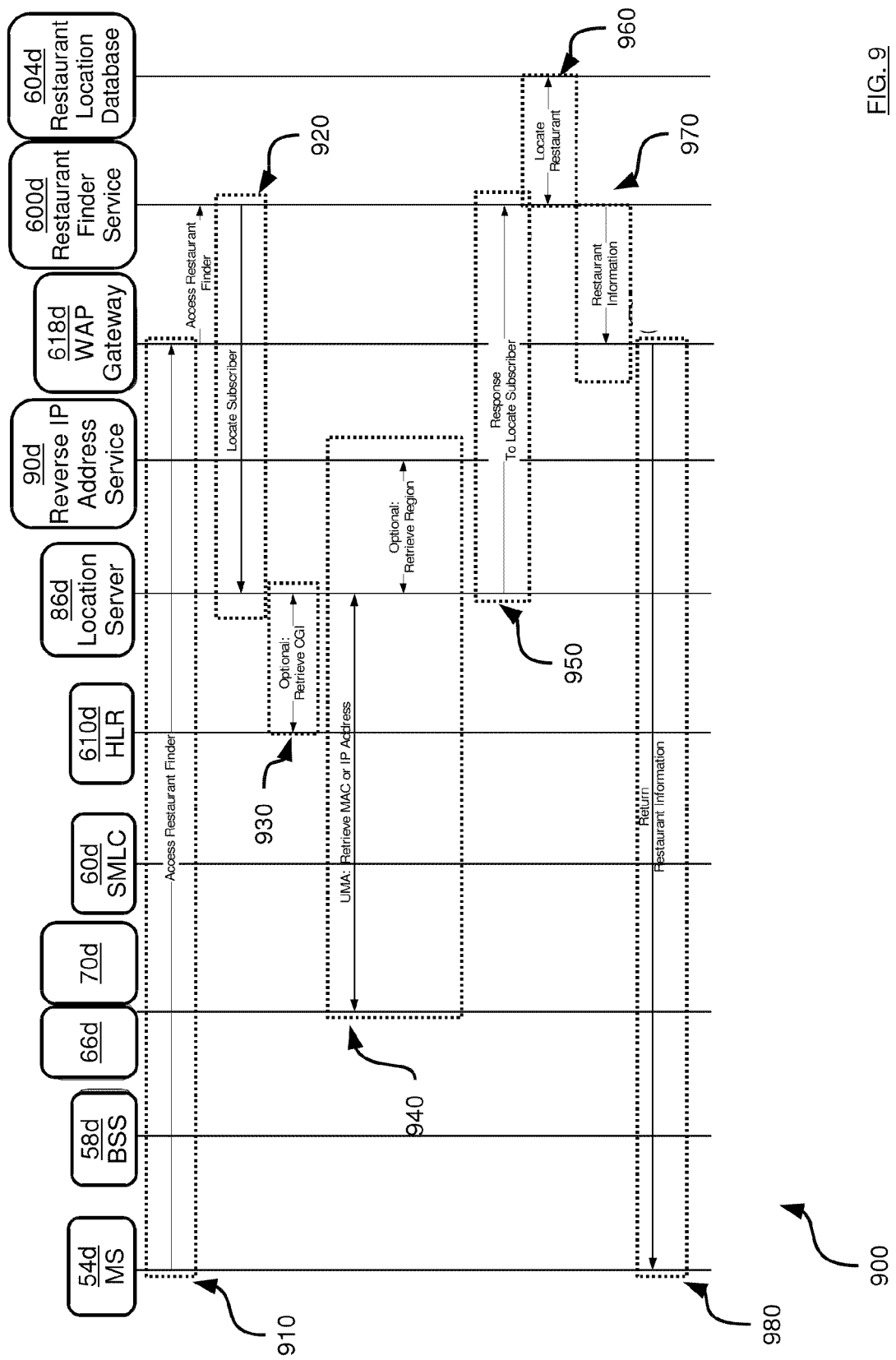
FIG. 9 is a call flow diagram that can be performed on the system for call routing of FIG. 8.

Referring now to FIG. 9, a method for call routing is depicted in the form of a call flow diagram and indicated generally at 900. Method 900 is presented for operation in conjunction with system 50d, and system 50d can be better understood by the following discussion of method 900, and vice versa. It should be understood, however, that both system 50d and method 900 can be modified. Method 900 in particular presents a call flow diagram for providing location services in a UMA context. Various processing blocks are identified in FIG. 9 within boxes denoted by dotted-lines. Those blocks are discussed further below. Method 900 assumes that application server 600d runs the exemplary restaurant finder application as previously discussed, but it is to be reemphasized that this is merely an example.

At block 910, MS 54d initiates a request for a restaurant from restaurant finder server 600d.

At block 920, restaurant server 600d sends a request to location server 86d to provide a location for MS 54d. The request will include the MSISDN and/or IMSI or comparable parameter of MS 54d. Restaurant server 600d may also send an indicator in the request that the MS 54d is accessing the network using UMA technologies.

At block 930, if restaurant server 600d does not provide an indication of whether MS 54-d is being served from via UMA technologies, then location server 86d can be configured to determine if MS 54-d is using UMA technologies via a query. Such a query may be sent to HLR 610d using protocols and procedures prescribed by the 3GPP or 3GPP2 such as the Any_Time_Interrogation or POSREQ query for GSM and CMDA based networks respectively. Note that HLR 610d can interact with the network (not shown) including SC 66d in order to retrieve the requested information. HLR 610d will respond to the location sever 86d with location and other information that will include a CGI or a comparable parameter.

At 940, location server 86d determines the location of MS 54-d based on the received information in the query as follows:
  a. On the basis of the received CGI parameter and uncertainty parameter or comparable parameters or alternatively from the received MAC address, the call will be determined to be originated from a UMA-capable BSS 58d (e.g. a wireless access point) located at a known subscriber's home or business. Location Server 86d will allocate a destination address on the basis of the received IMSI, MAC address, or comparable parameter as well as the called party number or comparable parameter; or
  b. On the basis of the received CGI parameter and uncertainty parameter or comparable parameters or alternatively from the received MAC address, the call will be determined to be received from a known public wireless IP access point (e.g. a WLAN hot-spot at a book-store). If the MAC address was not received by the Location Server 486d, the Location Server 486d will determine the identity of the UNC-capable SC 66d from the CGI parameter associated with the UMA-capable BSS 58d and the Location Server 86d will query the SC 66d in order to retrieve the MAC address for UMA capable BSS 58d at the hot-spot. Location Server 86d will allocate a destination address on the basis of the received MAC address, or comparable parameter as well as the called party number or comparable parameter; or
  c. On the basis of the received CGI parameter and uncertainty parameter or comparable parameters or alternatively on the basis of the received MAC or IP address, the call will be determined to be received from an unknown public or private wireless IP access point (e.g. a WLAN hot-spot at the residence of an associate of the UMA subscriber). If the IP address was not received by the Location Server 86d, the Location Server 86d will determine the UNC-capable BSS 58d from the CGI parameter or MAC address or comparable parameter and query the UNC-capable BSS 58d in order to retrieve the IP address associated with the UMA call. Location Server 86d will use a reverse IP address service 90d to determine the region (e.g. city name, postal code) associated with the UMA call. Location Server 86d will allocate a destination number on the basis of the received region information as well as the called party number or comparable parameter.

At block 950, location server 86d provides the location information obtained from block 940 to the restaurant finder server 600d.

At block 960, restaurant finder server 600d accesses the restaurant location database 604d to locate a restaurant pursuant to the request from MS 54d and the location information obtained at block 240.

At block 970, restaurant information server 600d returns the restaurant obtained at block 960 to WAP gateway 618d.

At block 980, the restaurant information is returned to the MS.

Figure 10:
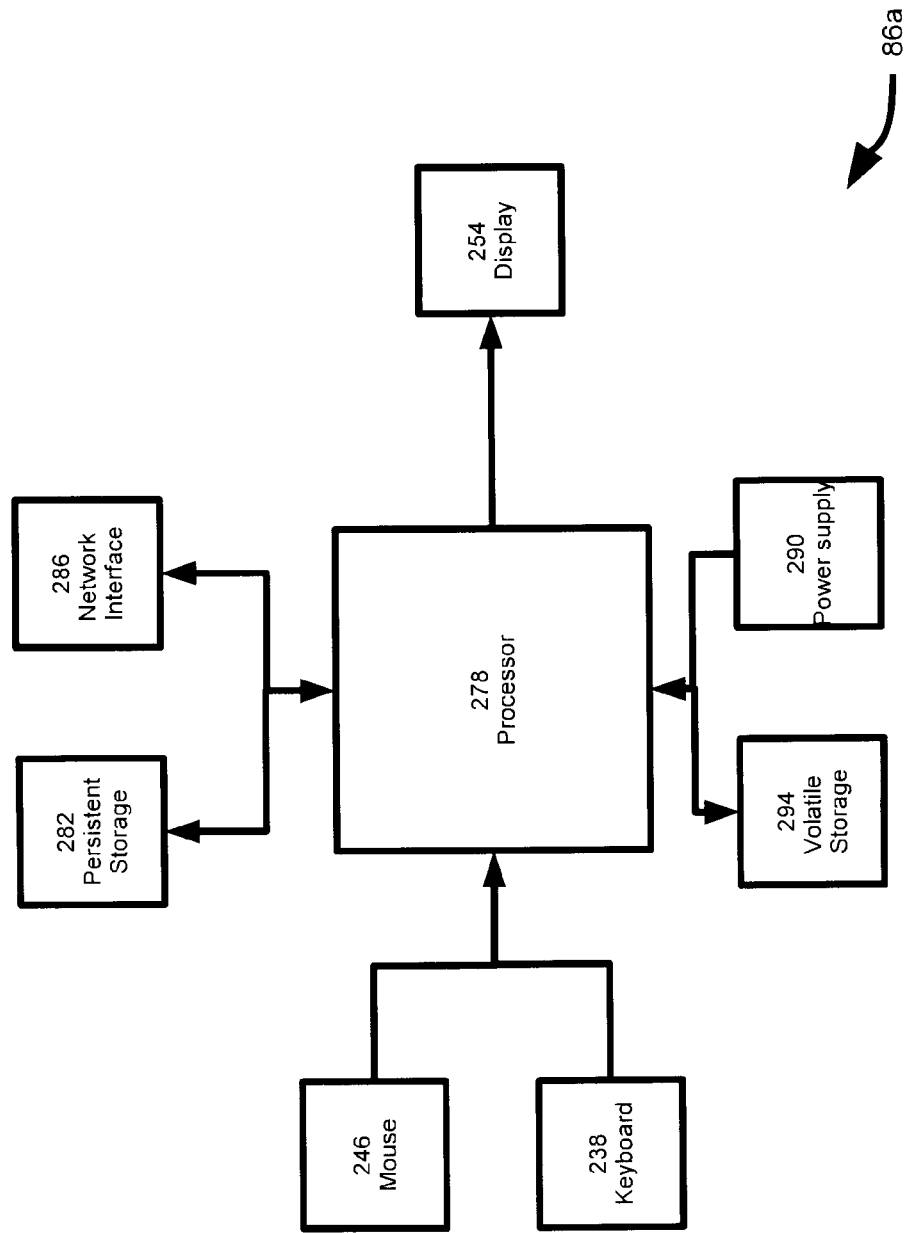
FIG. 10 is a schematic representation of the GGSN of FIG. 2.

It is to be understood that the various network elements described in relation to system 50, 50a, 50b, 50c and 50d can be based on known computing or hardware environments. Indeed, the structure and features of each network element can and typically do vary as between each other according to the functional specifications of each. However, to provide an example, FIG. 10 shows a block diagram representing exemplary components of GGSN 86a. Such components in FIG. 10, in a general sense, can also apply to other network elements, even though no figures for those elements are shown. GGSN 86a thus includes a processor 278 which interconnects input devices, if present, (e.g. a mouse 246 and keyboard 238) and output devices, if present, (e.g. a display 254). Again, such input device and output devices are optional and can be present to permit a system administrator to perform maintenance operations. Processor 278 is also connected to a persistent storage device 282. Persistent storage device 282 can be implemented using a hard disc drive or a redundant array of inexpensive discs ("RAID"), or the like, and/or can include other programmable read only memory ("PROM") technology and/or can include read only memory ("ROM") technology and/or can include a removable "smart card" and/or can comprised combinations of the foregoing.

GGSN 86a also includes at least one network interface 286 that connects processor 278 to the links shown in the Figures as part of a networking pathway between GGSN 86a and the other network elements. GGSN 86a also includes volatile storage 294, which can be implemented as random access memory ("RAM"), which can be used to temporarily store applications and data as they are being used by processor 278. Collectively, one can view processor 278, persistent storage 278 and volatile storage device 294 and as a microcomputer. It is now apparent that GGSN 86a can be based on the structure and functionality of a commercial server such as a Sun Fire X4450 Server from Sun Microsystems Inc., of Palo Alto, USA, but it is to be stressed that this is a purely exemplary server, as GGSN 86a (and other elements of system 50a and its variants) could also be based on any type of server computing device including from other manufacturers.

The microcomputer implemented on GGSN 86a is thus configured to store and execute the requisite BIOS, operating system and applications to provide the desired functionality of GGSN 86a, including, by way of non-limiting example, the storage and execution of programming to perform the functions described in relation to FIG. 3.

It is to be understood that variations, subsets, and/or combinations of the foregoing are contemplated. For example, the embodiments herein can be implemented as a programming instructions stored on a computer readable medium. As another example, as previously discussed, system 50c is an embodiment focused on core mobile network technology, such as GSM technology, whereas system 50d is an embodiment focused on VOIP technology. But it is to be understood that system 50c and system 50d can be combined to provide a hybrid system that is capable of serving an MS having capable of both core mobile network connectivity and VOIP connectivity. Indeed, it should be understood that systems 50, 50a, 50b, 50c, 50d can all be modified and/or combined to provide desired hybrid functionality, and that such modifications/combinations are at least one advantage provided herein.

The contents of all documents referenced herein are hereby incorporated by reference.

The invention claimed is:

1. A method for responding to a request for a routing parameter, the request received at a server from a network entity configured to route a communication originated from a communication device comprising:
    if said communication originates from a first network type, allocating said routing parameter on the basis of a first node identifier associated with a first node being accessed by said communication device; and
    if said communication originates from a second network type, then
        if said communication originates from a second node that has been previously associated with said communication device, then allocating said routing parameter based on either a second node identifier associated with said second node or a communication device identifier;
        if said communication originates from a third node that has not been previously associated with said communication device, and where said third node has been previously identified by the server prior to receiving the request, then allocating said routing parameter based on a third node identifier associated with said third node; and
        if said communication originates from a fourth node that has not been previously associated with said communication device, and where said fourth node has not been previously identified by the server prior to receiving the request, then allocating said routing parameter by:
            (i) retrieving an IP address identifying said fourth node,
            (ii) sending a query to a reverse IP address service,
            (iii) receiving an identification of a region associated with the communication from the reverse IP address service in response to the query, and
            (iv) allocating said routing parameter based on the region.

2. The method of claim 1 wherein said first network type is a mobile network selected from the group consisting of GSM, GPRS, CDMA, and WiMAX.

3. The method of claim 1 wherein said second network type is a UMA network.

4. The method of claim 3 wherein said UMA network is a WLAN network.

5. The method of claim 1 wherein said second node is a UMA hotspot located in a subscriber's business or home and said communication device is associated with that subscriber's business or home.

6. The method of claim 1 wherein said third node is a UMA hotspot located in a business or home not associated with a subscriber associated with the communication device.

7. The method of claim 1 wherein said fourth node is a UMA hotspot located in a business or home not associated with a subscriber associated with the communication device.

8. The method of claim 1 wherein said routing parameter is an emergency services routing key (ESRK).

9. The method of any one of claim 5, 6, or 7 wherein the UMA hotspot is a WLAN hotspot.

10. A method for responding to a request for location information for a communication device, the request received at a server from a network entity connected to the communication device, comprising:
    if said communications device is linked to a first network type, allocating said location information on the basis of a first node identifier associated with a first node being accessed by said communications device; and
    if said communication device is linked to a second network type, then
        if said communications device is linked to a second node that has been previously associated with said communication device, then determining the location information based on either a second node identifier associated with said second node or a communication device identifier;
        if said communications device is linked to a third node that has not been previously associated with said communication device, and where said third node has been previously identified by the server prior to receiving the request, then determining the location information based on a third node identifier associated with said third node; and
        if said communications device is linked to a fourth node that has not been previously associated with said communication device, and where said fourth node has not been previously identified by the server prior to receiving the request, then determining the location information by:
            (i) retrieving an IP address identifying said fourth node,
            (ii) sending a query to a reverse IP address service,
            (iii) receiving an identification of a region associated with the communication from the reverse IP address service in response to the query, and
            (iv) determining the location information based on the region.

11. An apparatus for responding to a request for location information for a communication device, the request received from at least one network entity connected to the communication device, comprising:
    an interface for connecting to said at least one network entity;
    a processor connected to said interface; said processor configured to determine if said communications device is linked to at least one of a first network type and a second network type, and,
        if said processor determines said communication device is linked to said first network type then said processor further configured to allocate said location information on the basis of a first node identifier associated with a first node being accessed by said communications device; and if said processor determines said communication device is linked to a second network type, then:
  said processor further configured to determine if said communications device is linked to a second node that has been previously associated with said communication device, in which case said processor is configured to determine the location information based on either a second node identifier associated with said second node or a communication device identifier;
  said processor further configured to determine if said communications device is linked to a third node that has not been previously associated with said communication device, and where said third node has been previously identified by the apparatus prior to receiving the request, in which case said processor is configured to determine the location information based on a third node identifier associated with said third node; and
  said processor further configured to determine if said communications device is linked to a fourth node that has not been previously associated with said communication device, and where said fourth node has not been previously identified by the apparatus prior to receiving the request, in which case said processor is configured to determine the location information by:
    (i) retrieving an IP address identifying said fourth node,
    (ii) sending a query to a reverse IP address service,
    (iii) receiving an identification of a region associated with the communication from the reverse IP address service in response to the query, and
    (iv) determining the location information based on the region.

12. The apparatus of claim 11 wherein said first network type is a mobile network selected from the group consisting of GSM, GPRS, CDMA, and WiMAX.

13. The apparatus of claim 11 wherein said second network type is a UMA network.

14. The apparatus of claim 13 wherein said UMA network is a WLAN network.

15. The apparatus of claim 11 wherein said second node is a UMA hotspot located in a subscriber's business or home and said communication device is associated with that subscriber's business or home.

16. The apparatus of claim 11 wherein said third node is a UMA hotspot located in a business or home not associated with a subscriber associated with the communication device.

17. The apparatus of claim 11 wherein said fourth node is a UMA hotspot located in a business or home not associated with a subscriber associated with the communication device.

18. The apparatus of claim 11 wherein said location information is an emergency services routing key (ESRK).

19. The apparatus of any one of claim 15, 16, or 17 wherein the UMA hotspot is a WLAN hotspot.

* * * * *